United States Patent
Ohtsuka et al.

(10) Patent No.: US 6,331,081 B1
(45) Date of Patent: Dec. 18, 2001

(54) OPTICAL TRANSMISSION MEMBER AND MANUFACTURING METHOD THEREFOR

(75) Inventors: Kenichiro Ohtsuka; Tomohiko Ueda; Toshiaki Kakii, all of Yokohama (JP)

(73) Assignee: Sumitomo Electric Industries, Ltd., Osaka (JP)

(*) Notice: Subject to any disclaimer, the term of this patent is extended or adjusted under 35 U.S.C. 154(b) by 0 days.

(21) Appl. No.: 09/380,733

(22) PCT Filed: Mar. 11, 1998

(86) PCT No.: PCT/JP98/01019

§ 371 Date: Sep. 13, 1999

§ 102(e) Date: Sep. 13, 1999

(87) PCT Pub. No.: WO98/40772

PCT Pub. Date: Sep. 17, 1998

(30) Foreign Application Priority Data

Mar. 13, 1997 (JP) .................................................. 9-059664
Oct. 6, 1997 (JP) .................................................. 9-272856

(51) Int. Cl.$^7$ ........................................................ G02B 6/36
(52) U.S. Cl. .............................. 385/85; 385/86; 385/87; 385/51; 385/52; 385/53
(58) Field of Search ........................... 385/85, 86, 87, 385/51, 52, 53

(56) References Cited

U.S. PATENT DOCUMENTS

| 4,662,713 | 5/1987 | Davies et al. ................. 350/96.2 |
| 4,925,266 | * 5/1990 | Huebscher et al. ............ 350/96.2 |
| 4,934,785 | * 6/1990 | Mathis et al. ................ 350/96.21 |
| 5,425,118 | 6/1995 | Sugihara et al. ................. 385/51 |
| 5,621,835 | * 4/1997 | Takahashi et al. ............... 385/78 |

FOREIGN PATENT DOCUMENTS

| 55-138706 | 10/1980 | (JP) . |
| 58-108507 | 6/1983 | (JP) . |
| 61-132910 | 6/1986 | (JP) . |
| 62-14403 | 1/1987 | (JP) . |
| 63-49711 | 3/1988 | (JP) . |
| 63-216010 | 9/1988 | (JP) . |
| 63-316811 | 12/1988 | (JP) . |
| 4-43308 | 2/1992 | (JP) . |
| 6-201936 | 7/1994 | (JP) . |
| 7-43556 | 2/1995 | (JP) . |
| 7-306333 | 11/1995 | (JP) . |
| 8-248265 | 9/1996 | (JP) . |
| 9-61655 | 3/1997 | (JP) . |
| 97/08575 | 3/1997 | (JP) . |

OTHER PUBLICATIONS

Masaru Kobayashi, Shin–ichi Iwano, Ryo Nagase and Seiko Mitachi, "Fiber Physical Contact Optical Connector," Special Feature (2): Optical Connector Technologies, vol. 9 No. 2, Mar. 1997, pp. 72–77.

* cited by examiner

Primary Examiner—Mohammad Sikder

(57) ABSTRACT

An optical transmission component and a method of making the same in which one or a plurality of optical fibers 1 are fixed to a main body 3 of the optical transmission component with one end face of each optical fiber being exposed, and thus exposed end face is used as a connecting end face to be optically connected to another optical transmission component. The coating 1$b$ of each optical fiber 1 is removed, so as to expose a predetermined length of an optical fiber 1$a$. An end face 1$c$ of thus exposed optical fiber is processed by spark discharge processing in a short period of time, such that at least the front end of a core portion projects from the front end of its cladding portion. Thus processed optical fiber 1 is inserted into the main body and fixed thereto with an adhesive 5, while a predetermined pressure is being added along the optical axis of each optical fiber 1 from the end face 1$c$ side.

14 Claims, 15 Drawing Sheets

OPTICAL TRANSMISSION MEMBER AND MANUFACTURING METHOD THEREFOR

This application is the national phase of international application PCT/JP98/01019 filed Mar. 11, 1998 which designated the U.S.

TECHNICAL FIELD

The present invention relates to an optical transmission component optically connected, at an end face thereof, to another optical component; and, in particular, to an optical transmission component such as optical connector or optical module utilizing an optical fiber.

BACKGROUND ART

In optical transmission, for relaying, amplification, and the like, it is necessary to optically connect optical fibers together or an optical fiber to a light-emitting device, a light-receiving device, an amplifier, or the like. Such an optical connection is realized by butting the end faces of optical fibers together or the end face of the optical fiber and the light-receiving (or light-emitting) face of such a device against each other.

For example, regarding optical connectors, various kinds of techniques have been proposed concerning the method of processing and fixing the front end face of an optical fiber. The method of making an optical connector disclosed in Japanese Patent Application Laid-Open No. 7-306,333 describes a method for rounding corners in a front end portion of an optical fiber by heat treatment, the chemical processing with an acid or the like, and physical processing with abrasive grains. Also, the method of processing an end face of an optical fiber disclosed in Japanese Patent Application Laid-Open No. 55-138,706 is a method in which the end face of the optical fiber is heated by discharge such as to yield a roundness with a radius not smaller than the radius of the optical fiber. These documents, however, do not disclose any specific technique for fixing an optical fiber to an optical connector.

The method of making an optical connector disclosed in Japanese Patent Application Laid-Open No. 58-108,507 employs a technique in which, after a front end face of a cut optical fiber is melted so as to become smooth, the optical fiber is inserted into the core of the connector and secured therein with an adhesive. Here, the position to secure the optical fiber is where the tip of the optical fiber and the tip of the core substantially match each other. In the matching process, the optical fiber is moved and positioned such that the tip of the optical fiber is disposed at the same position as the front end face of the core or slightly inside thereof, while being observed through a microscope or by placing a planar jig made of a material softer than the optical fiber at the tip of the core.

On the other hand, the optical connector disclosed in "Fiber PC Optical Connector" in NTT R&D vol. 45, No. 6 (1996), pp. 95–100 employs a method in which an optical fiber subjected to end-face processing for chamfering the cleavage plane thereof is fixed such as to project from an end face of a ferrule. The amount of projection is a value at which, in a connected state, the optical fiber is buckled by a pressure. It aims at maintaining a contact pressure by buckling. Consequently, a space for allowing the optical fiber to flex is secured within the ferrule.

DISCLOSURE OF THE INVENTION

In the conventional techniques mentioned above, the grinding process in the end-face processing is disadvantageous in that it takes time to process. Also, the chemical processing is hard to yield a form suitable for so-called PC (Physical Contact) in which front end faces of optical fibers are butted together for establishing an optical connection, and thus is disadvantageous. The techniques of Japanese Patent Application Laid-Open Nos. 7-306,333 and 55-138,706 disclosing, instead, heat treatments by discharge aim at eliminating burrs of optical fibers upon a discharging process, and none of them takes account of making a PC-suitable form.

It can be concluded that considerations have conventionally been insufficient for carrying out the end-face processing of an optical fiber in view of PC and, further, for placing and fixing the optical fiber into an optical connector in view of PC.

In particular, in the case where an optical fiber ribbon including a plurality of optical fibers is cut and fixed to a connector, a fluctuation of about 8 to 20 $\mu$m inevitably occurs at the front end position of the optical fiber. In the technique disclosed in the publication "Fiber PC Optical Connector" mentioned above, the fluctuation in length is absorbed while establishing the PC by buckling the optical fiber, whereby the possibility of the optical fiber being broken or connection loss being enhanced due to the buckling would certainly increase. Hence, it is disadvantageous in that there is a risk of the reliability thereof becoming insufficient.

In view of the above-mentioned problems, it is an object of the present invention to provide an optical transmission component having a connecting end face capable of connecting at a high accuracy, and a method of making the same.

In order to overcome the above-mentioned problems, the method of making an optical transmission component is a method of making an optical transmission component in which one or a plurality of optical fibers are fixed to a main body of an optical transmission component with one end face of each optical fiber being exposed, and thus exposed end face is used as a connecting end face to be optically connected to another optical transmission component, the method comprising: (1) a step of removing a coating of each optical fiber so as to expose a predetermined length of an optical fiber; (2) a step of processing thus exposed end face of the optical fiber by spark discharge processing for a short period of time; and (3) a process of inserting thus processed optical fiber into the main body of the optical transmission component and fixing the optical fiber to the main body while adding a predetermined pressure to the optical fiber along the optical axis thereof from the end face side.

In the optical transmission component made according to these steps, burrs are eliminated from the connecting end face of each optical fiber due to the discharge processing, whereby the end face is processed into a PC-suitable form. Also, since the processed optical fibers are secured while a predetermined pressure is being added thereto along their optical axis direction from the end face side, their front ends on the end face side align with each other. Hence, PC can securely be established in the case of multi fibers as well.

Preferably, the predetermined pressure is less than the buckling load of the optical fiber. In this case, the optical fiber is prevented from buckling upon fixing, whereby its quality can be maintained.

Preferably, the optical fibers are inserted into the main body of the optical transmission component such that their respective end faces project from the connecting end face of the main body by a predetermined amount. As a consequence, the tip positions of the end faces can securely be aligned with each other. Preferably, the amount of projection is not greater than 0.2 mm.

The optical fibers can be fixed with an adhesive. At least a part of the main body may be made of a UV-transmitting material, and a UV-curable adhesive may be used as the adhesive and solidified upon irradiation with ultraviolet rays, so as to secure the optical fiber. Alternatively, the adhesive may be a thermosetting adhesive.

Also, the optical fibers may mechanically be fixed into the main body. The main body may have an optical fiber positioning portion and an optical fiber fixing portion, and the optical fiber fixing portion may hold the optical fiber by utilizing a deformation of a member. Further, it is preferred that the optical fiber fixing portion be constituted by at least two holding members for holding the optical fiber from both directions across the optical fiber, and a pressing member. More preferably, at least one of these holding members is made of aluminum or a plastic.

Further, in the case where, in the step of fixing the optical fiber, a wedge-shaped member is inserted into a recess formed at a juncture between the holding members so as to broaden a gap at the juncture between the holding members, into which the optical fiber is inserted, and then, with a predetermined pressure added thereto, the wedge-shaped member is pulled out from the recess, thereby allowing the holding members to hold the optical fiber therebetween, the optical transmission component can favorably be manufactured in a simple manner in a short period of time.

Alternatively, the main body may be made of glass, and the optical fiber and the main body may be integrated and fixed together upon heating.

In particular, each of these optical fibers is preferably a graded index type optical fiber, since its core portion is melted earlier upon discharge heating such as to be easily processed into a form projecting from the cladding portion.

The projecting height of the core portion with respect to the cladding portion after processing is preferably 1 to 6 $\mu$m at the center of the core portion. It is due to the fact that, if it is caused to project more, the melting time may become so long that the cladding portion may also be melted, thereby deteriorating fiber characteristics and so forth.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIGS. 17A and 17B are explanatory views of another embodiment of the clip member in the embodiment shown in FIG. 11, in which FIGS. 17A and 17B are a plan view and a sectional view taken along the line B—B, respectively;

BEST MODES FOR CARRYING OUT THE INVENTION

Figure 1:
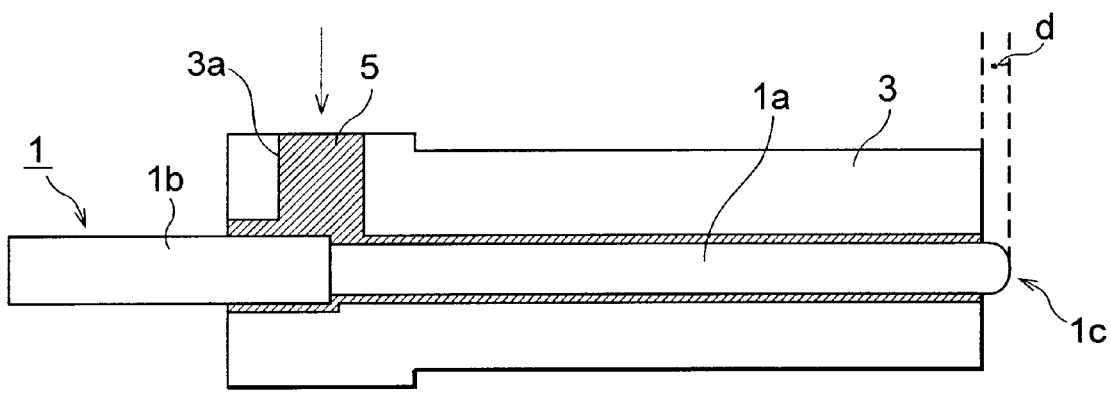
FIG. 1 is a sectional configurational view of an optical connector which is a first embodiment in accordance with the present invention.

In the following, preferred embodiments of the present invention will be explained with reference to the accompanying drawings. To facilitate the comprehension of the explanation, the same reference numerals denote the same parts, where possible, throughout the drawings, and a repeated explanation will be omitted. Each drawing may include therein portions whose size and form are depicted with exaggeration in order to facilitate the comprehension of the invention and do not always match the size and form in the actual embodiments.

FIG. 1 is a sectional configurational view showing an optical connector including a plurality of optical fibers which is a first embodiment in accordance with the present invention. Here, a multi-fiber optical connector including four optical fibers will be explained as an example.

Figure 2:
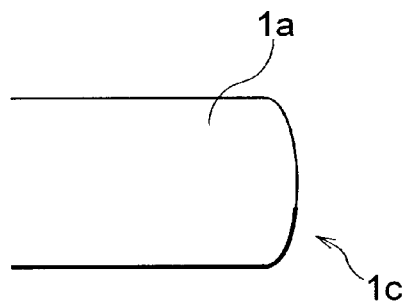
FIG. 2 is an enlarged sectional view of an optical fiber end face of the optical connector shown in FIG. 1.

This multi-fiber optical connector is constituted in such a manner that, a coating portion 1b is removed from an optical fiber ribbon 1 in which four optical fibers have been arranged in line and processed into a ribbon-like form and, with their end faces 1c aligning with each other, thus exposed optical fibers 1a are fixed into an optical connector main body with an adhesive 5. As shown in FIG. 2, the end face 1c of each optical fiber 1a is chamfered and is shaped into such a form that the end face projects in the optical axis direction thereof.

A method of making this optical connector will now be explained with reference to FIGS. 3A to 3D.

Figure 3A:
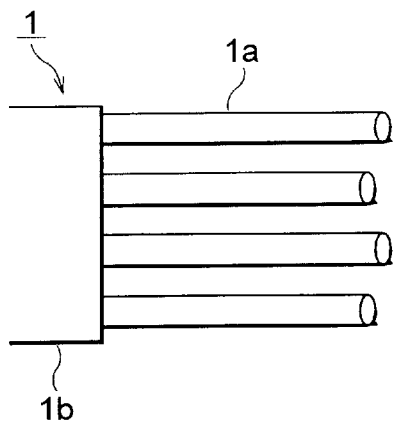
FIGS. 3A to 3D are views for explaining manufacturing steps of the optical connector shown in FIG. 1.

As shown in FIG. 3A, the optical fiber ribbon 1 including four optical fibers 1a is cut, and a predetermined length of the coating portion 1b is removed from its front end part, such that each optical fiber 1a is exposed. In this state, a fluctuation inevitably occurs in the length of the exposed portions of the optical fibers 1a, thus making their front end positions irregular. This fluctuation is, for example, about 8 to 20 μm. Upon cutting, the front end face 1c does not become a complete plane but, as shown under magnification in FIG. 3B, often forms a burr 1d in its cutting face.

Figure 3B:
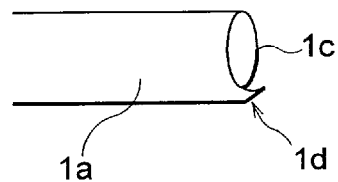
Figure 3C:
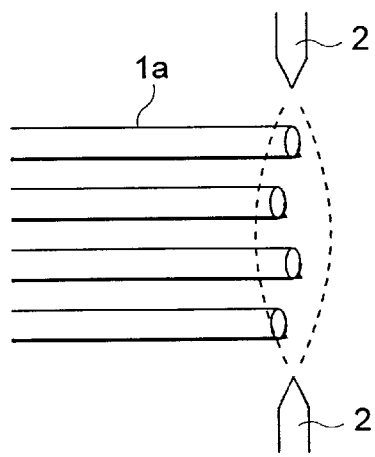

Hence, processing for eliminating the burr 1d is subsequently carried out. As shown in FIG. 3C, this processing is effected through a heat treatment performed by spark discharge processing in a short period of time. Upon heating, the end face 1c of the optical fiber 1a is somewhat melted. Upon this melting, the end face 1c becomes a curved surface due to surface tension, thus yielding a form such as that shown in FIG. 2, which resembles radius processing effected by chamfering.

Figure 3D:
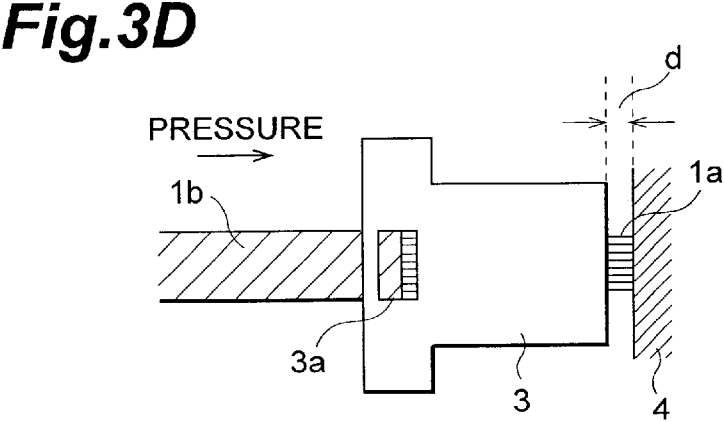

Subsequently, the optical fiber thus subjected to the end-face processing is attached to the optical connector main body 3. As shown in FIG. 3D, the connecting face (front end face) of the optical connector 3 is secured such as to keep a predetermined distance d with respect to a reference face 4, and the optical fiber ribbon 1 in which the end faces 1c of the optical fibers 1a have already been processed is inserted into the optical fiber fixing portion of the optical connector main body 3 from the end face 1c side. Then, the optical fiber ribbon 1 is pressed against the end face 1c in the optical axis direction such as to apply a predetermined pressure to the end face of the optical fiber 1a. Here, the pressure must be less than the buckling load of the optical fiber 1a in the optical fiber 1. While the optical fiber 1 is held in this pressed state, the adhesive 5 is injected through an adhesive injection hole 3a of the optical connector 3 and then is solidified, such that the optical fibers 1a and the coating portion 1b, as the optical fiber ribbon 1, are fixed to the optical fiber fixing portion within the optical connector 3. As a consequence, in the fixed state, the optical fiber 1a is fixed at the connecting face of the optical connector 3 with their front ends projecting by d.

As explained above, when fixing the optical fiber ribbon into the optical connector 3, the pressure applied to this optical fiber 1 must be less than the buckling load of the optical fiber 1. It is due to the fact that, when the pressure is greater than the buckling load, buckling naturally occur in the optical fiber, whereby there is a possibility of unfavorable events such as deterioration in transmission characteristics and damages in the optical fiber occurring. The buckling load will now be explained.

The buckling load Pb of an optical fiber is given by:

$$Pb = 4\pi^2 EI/L^2$$

wherein
L: length of the optical fiber receiving a pressure;
E: Young's modulus of the optical fiber; and
I: sectional secondary moment.

Here, the sectional secondary moment I is given by:

$$I = \pi d^4/64$$

wherein the diameter of the optical fiber is d.

Figure 4:
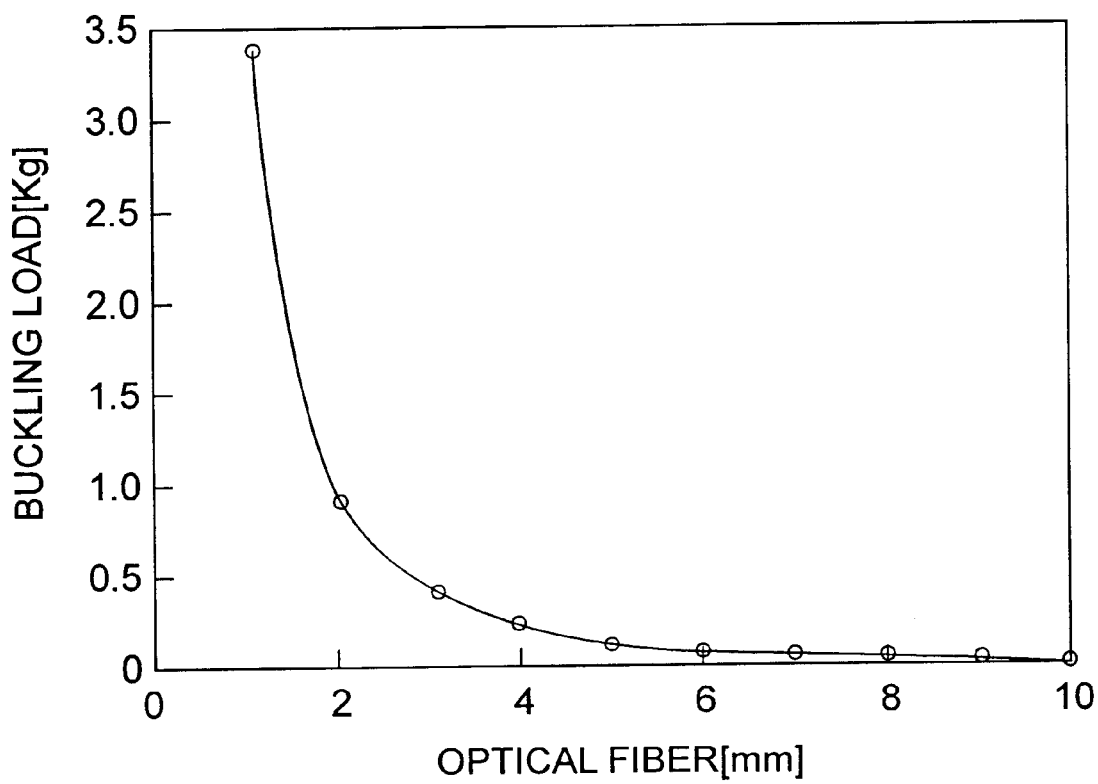
FIG. 4 is a graph showing a relationship between optical fiber length and buckling load.

FIG. 4 shows the results obtained when the buckling load Pb with respect to a given optical fiber length L is calculated according to the above-mentioned two equations, in which, as an example, $E = 7200$ kg/mm$^2$, and
$d = 0.125$ mm.

In the present invention, the fixing operation is effected while a pressure less than the buckling load is applied to each of the optical fibers. As a consequence, without the optical fibers 1b being bent due to buckling, their front end portions can accurately be aligned with each other.

Further, as the respective end faces 1c of the optical fibers 1a fixed to the optical connector 3 are in the state where they project from the connecting face of the optical connector 3 by d as shown in FIG. 1, when such optical connectors are coupled together, the optical fiber end faces 1c of both connectors would securely come into contact with each other, thereby assuring a favorable optical connection. Here, if the amount of projection d of the optical fiber 1a is too large, when coupling the optical connectors together, problems such as bending and buckling of the front end portion of the optical fibers 1a or deviations in optical fiber end face positions of both optical connectors may occur, thus failing to establish optical coupling and so forth. For preventing these problems, the amount of projection d is preferably made as small as possible, and is desirably not greater than 0.2 mm in particular.

As the adhesive employed for fixing the optical fiber to the optical connector, appropriate adhesives such as thermosetting adhesives exemplified by epoxy adhesives, UV-curable adhesives, and the like can be used. When using a UV-curable adhesive, in order that the ultraviolet rays irradiated for curing the adhesive may securely reach the adhesive injected between the optical fiber and the optical connector main body, at least a part of the members constituting the optical connector main body is needed to be constituted by a UV-transmitting material.

Though various kinds of optical fibers can be used in this embodiment, GI (graded index) type optical fibers are preferable in particular. The details thereof will now be explained.

Figure 5A:
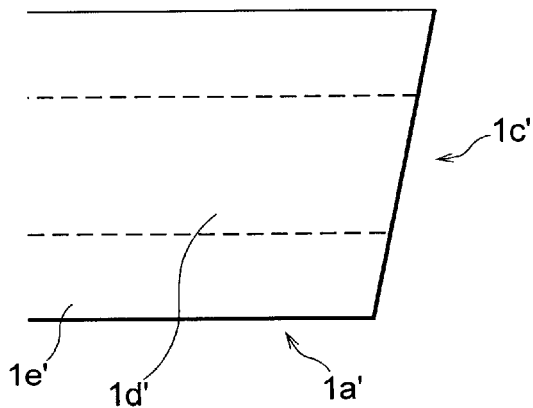
FIGS. 5A and 5B are views for explaining end-face processing of a graded index (GI) type optical fiber.
Figure 5B:
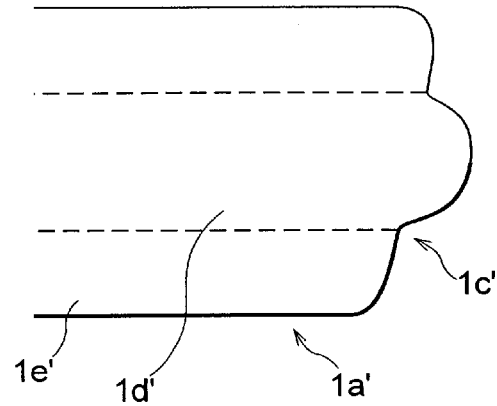
Figure 6:
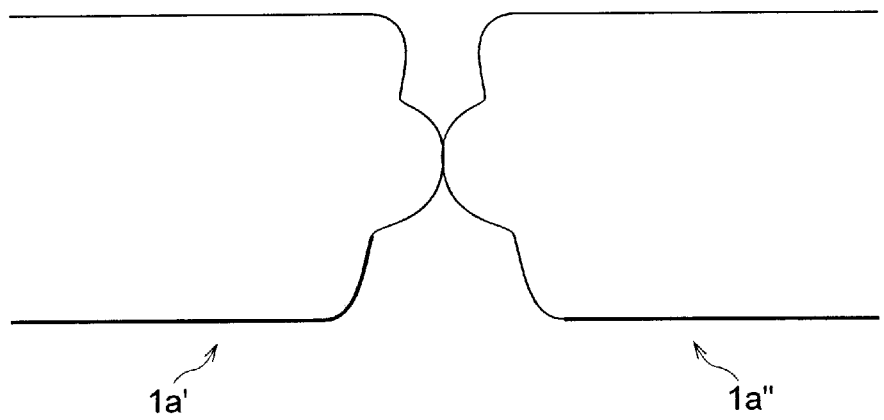
FIG. 6 is a view showing the butting between optical fibers which have been subjected to the end-face processing shown in FIGS. 5A and 5B.

FIGS. 5A, 5B, and 6 are views for explaining the process of end-face discharge processing in the case where a GI type optical fiber is used in this embodiment, in which FIG. 5A is a side view of an end face after being cut, FIG. 5B is a side view after discharge processing, and FIG. 6 is a side view showing the state upon connection.

First, as with the above-mentioned step shown in FIG. 3A, a GI type optical fiber 1a' is stripped of its coating and cut into a predetermined length. FIG. 5A shows thus cut state. It is difficult to cut the end face 1c' such as to make it accurately orthogonal to the optical axis, and thus cut end face would generally yield a form inclined with respect to a section orthogonal to the optical axis. Also, a burr may occur as shown in FIG. 3B. In a manner similar to that shown in FIG. 3C, the front end portion of the GI type optical fiber 1a' is subjected to the end-face processing effected by spark discharge. In the discharge processing, short-term discharge is performed once or a plurality of times. For example, at an inter-electrode voltage of 15000 V and a current of 12 to 16 mA, discharge of 0.1 to 0.6 second per operation is effected 1 to 5 times, so as to carry out processing.

FIG. 5B shows the form of the resulting processed end face 1c'. The GI type optical fiber 1c' is doped with Ge or the like as a dopant for enhancing the refractive index of its core portion 1d', whereby it has a softening point lower than that of the cladding portion 1e' undoped therewith and is easier to melt. As a consequence, when heated upon discharge processing, the core portion 1d' is easier to soften, whereas the cladding portion 1e' is less softened than the core portion 1d', whereby the core portion 1d' projects from the cladding portion 1e' due to surface tension. At this time, the edges of the cladding portion 1d' are also rounded, and burrs, if any, are melted and rounded.

Since the core portion 1d' thus projects, in the case where the GI type optical fibers 1a' and 1a" are brought into contact with each other such as to establish an optical connection as shown in FIG. 6, it becomes easier to butt their core portions against each other, whereby their end faces securely come into contact with each other, thus yielding a secure optical connection.

Figure 7:
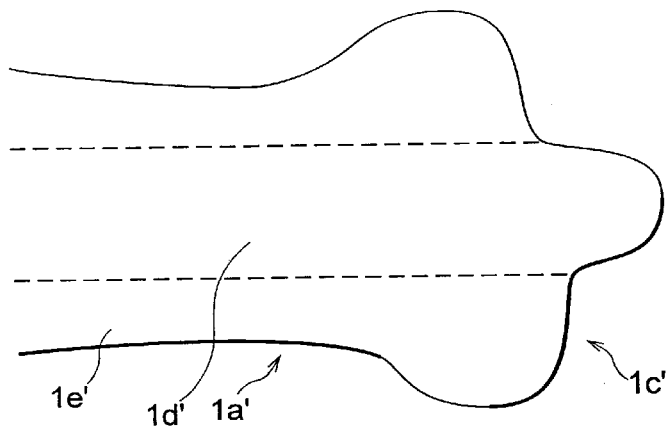
FIG. 7 is a view showing an unfavorable example of end-face processing for a GI type optical fiber.

When the time or number of discharge processing operations is so much, the cladding portion 1d' may also melt, thus increasing the outside diameter at the end face as shown in FIG. 7, whereby the core portions 1d' and cladding portions 1e' respectively melt together, thus not only causing the connection loss at the end face to increase, but also preventing the front end portion of the optical fiber from being inserted into the optical fiber fixing portion of the optical connector main body. Hence, the excessive discharge processing to the extent of melting the cladding portion 1e' must be avoided.

Figure 8A:
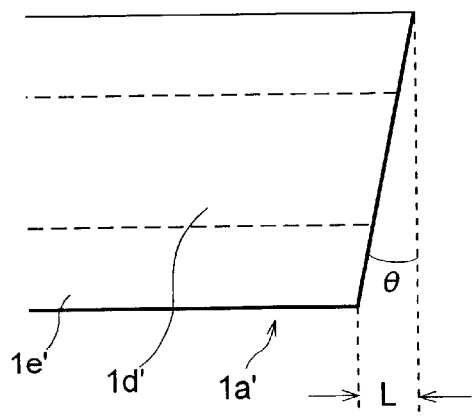
FIGS. 8A and 8B are explanatory views for explaining, in further detail, the conditions of the end-face processing shown in FIGS. 5A and 5B.
Figure 8B:
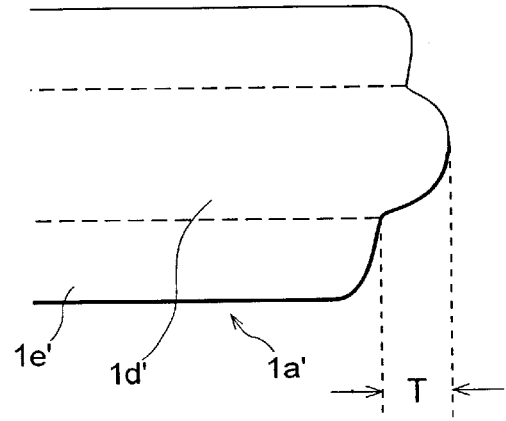

Here, with reference to FIGS. 8A and 8B, the amount of processing caused by desirable discharge processing will be explained. FIG. 8A is a side view of an optical fiber in a cut state, whereas FIG. 8B is a side view of the optical fiber after discharge processing. It has already been explained that, in the state where the GI type optical fiber 1a' is cut as shown in FIG. 8A, the end face is generally inclined with respect to a section orthogonal to the optical axis. The angle of inclination θ here is, at worst, about 1.5° with the current optical fiber cutters. In the case where the angle of inclination is 1.5°, the length L between the front edge and rear edge of the end face in the optical axis direction is about 3 μm. Further, since the edges of the cladding portion 1e' are also chamfered upon the discharge processing, when the height T of the center of the core portion 1d' projecting from the cladding portion 1e' after the discharge processing as shown in FIG. 8B is at least about 1 μm, the projecting center of the core portion 1d' projects in the optical axis direction more than any other portion of the cladding portion 1e'. As a consequence, when optical fibers having thus processed end faces are butted against each other, their core portions securely come into contact with each other. If a cladding portion projects, only the cladding portions will come into contact with each other without bringing the core portions into contact with each other, thus forming a gap therebetween and enhancing connection loss. In this embodiment, such an event would not occur, whereby the connection loss can be kept low.

Figure 9:
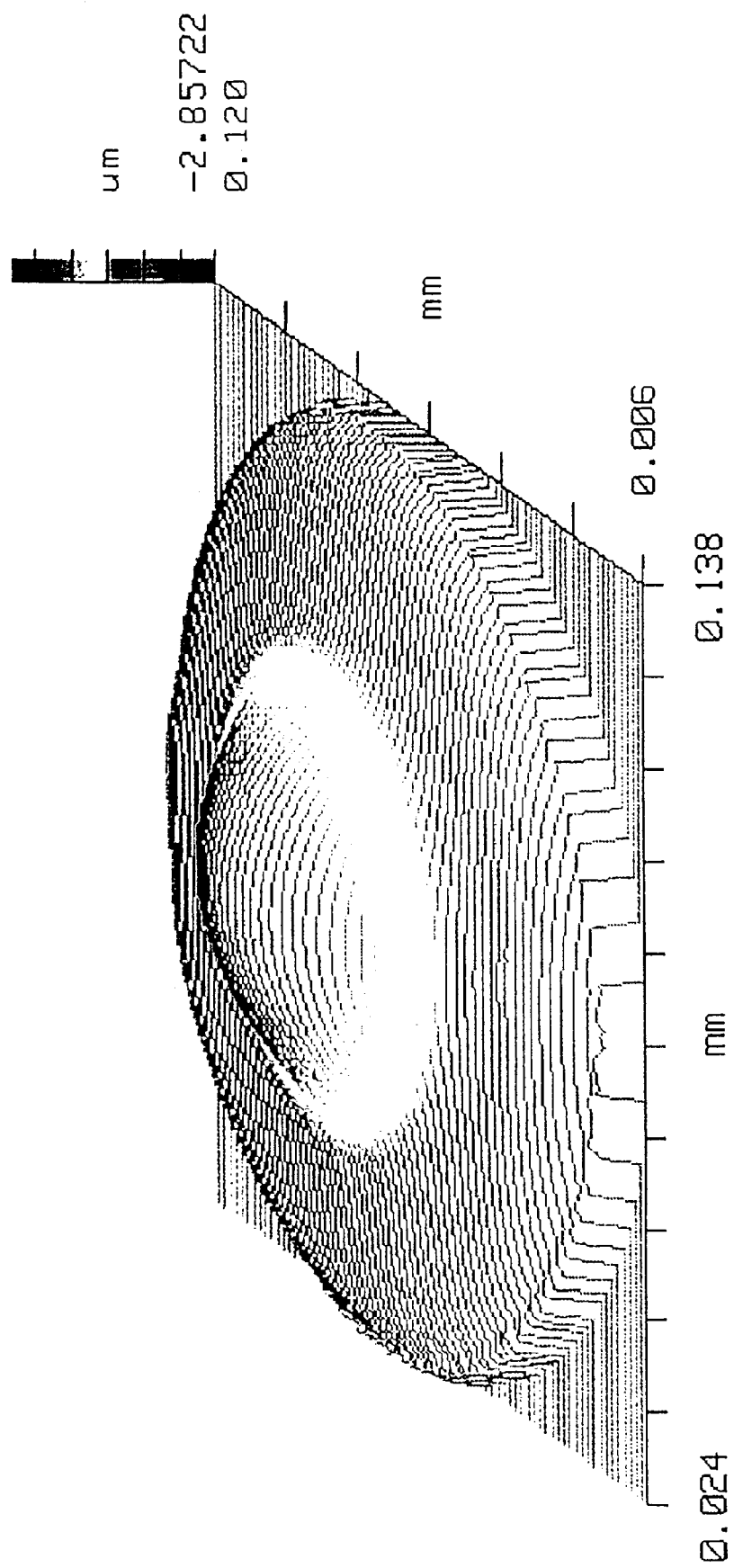
FIG. 9 is a view three-dimensionally showing the results of measurement of the GI type optical fiber subjected to the end-face processing shown in FIGS. 5A and 5B.

FIG. 9 three-dimensionally shows results of measurement of the end face form in thus processed GI type optical fiber. Here, displayed are the results of measurement in which the scanning type white interferometer NewView 200 produced by Zygro Corporation is used for measuring interference images of the end face, and the shape analysis software MetroPro™ produced by Zygro Corporation is used for image processing. FIG. 9 shows the results of end face measurement obtained after an end face of a GI type optical fiber having a core diameter of 62.5 μm is processed by the above-mentioned discharge processing. As can be seen from FIG. 9, the core portion projects in the optical axis direction. This projecting height is about 3.5 μm.

Figure 10:
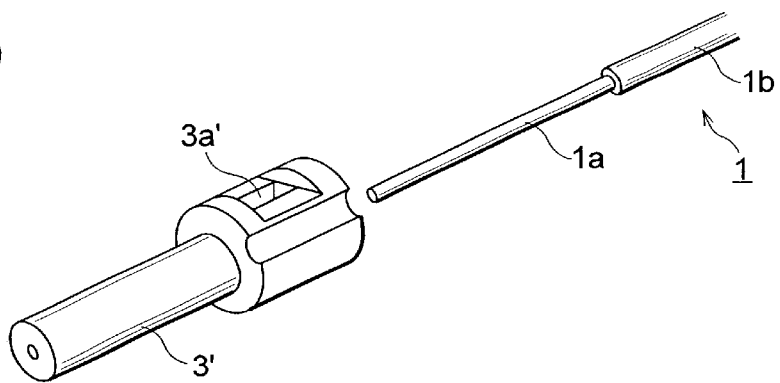
FIG. 10 is an explanatory view showing an optical connector including a single optical fiber which is a second embodiment of the present invention.

In the following, with reference to FIG. 10, a second embodiment in which the present invention is applied to a bonding type optical connector including single optical fiber will be explained. While an optical fiber 1 subjected to end-face processing such as that explained in conjunction with FIGS. 3A to 3D is inserted into an optical connector 3' from therebehind, the optical connector 1 is pressed toward its end face along the optical axis direction, such that the amount of projection of the end face from the optical connector 3' is set to a predetermined value. Thereafter, an adhesive is injected through an adhesive injection hole 3a' and then is solidified, whereby the optical fiber 1a and the coating portion 1b are fixed to the main body of the optical connector 3'. The sectional form in thus fixed state is substantially the same as that of each fiber portion in the multi-fiber optical connector shown in FIG. 1. As a consequence, this embodiment can reduce the optical coupling loss upon connection as with the first embodiment.

A third embodiment of the optical connector in accordance with the present invention and a method of making the same will now be explained.

Figure 11:
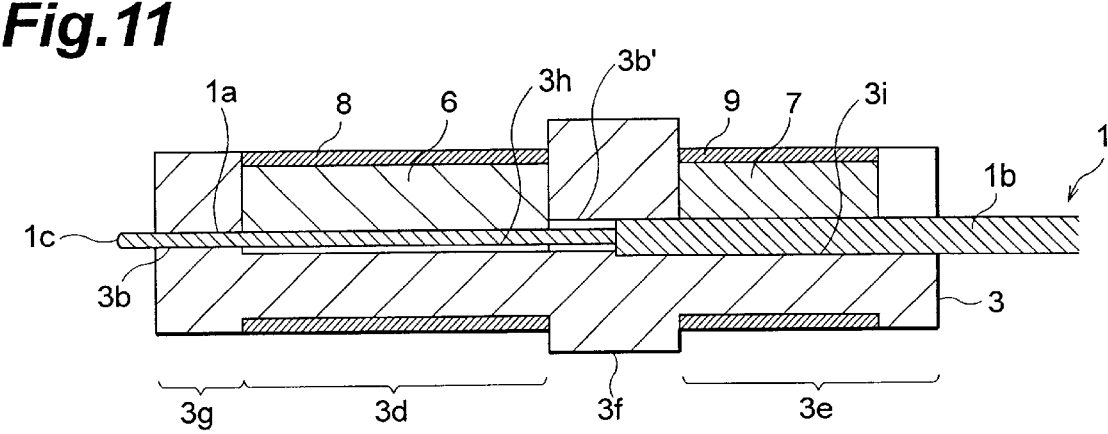
FIG. 11 is a sectional view of an optical connector including a plurality of optical fibers which is a third embodiment of the present invention.
Figure 12:
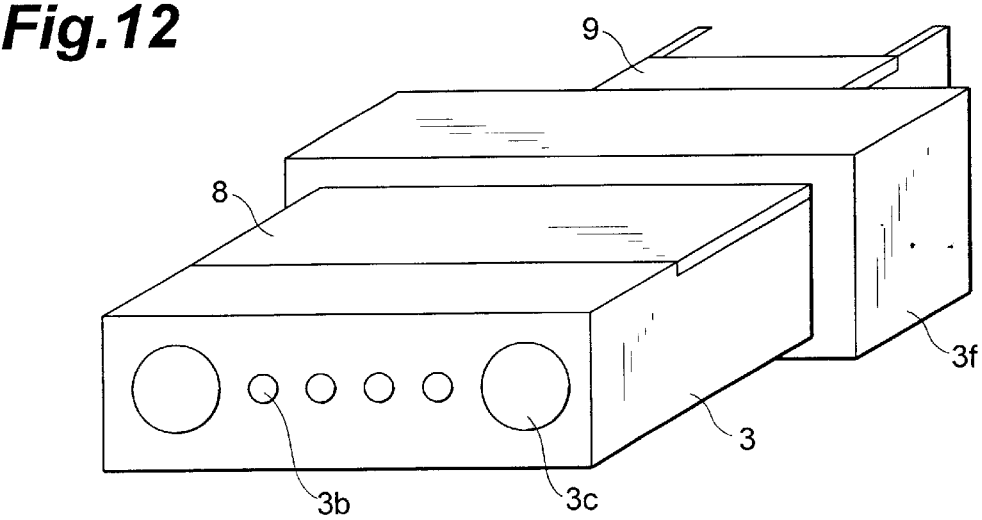
FIG. 12 is a perspective view of the main body portion of the optical connector shown in FIG. 11.

First, with reference to FIGS. 11 to 13, the configuration of this multi-fiber optical connector will be explained. FIG. 11 is a sectional configurational view of this multi-fiber optical connector. FIG. 12 is a perspective view of the connector main body portion of the multi-fiber optical connector, from which optical fibers have been removed, whereas FIG. 13 is an exploded perspective view of the multi-fiber optical connector.

Figure 13:
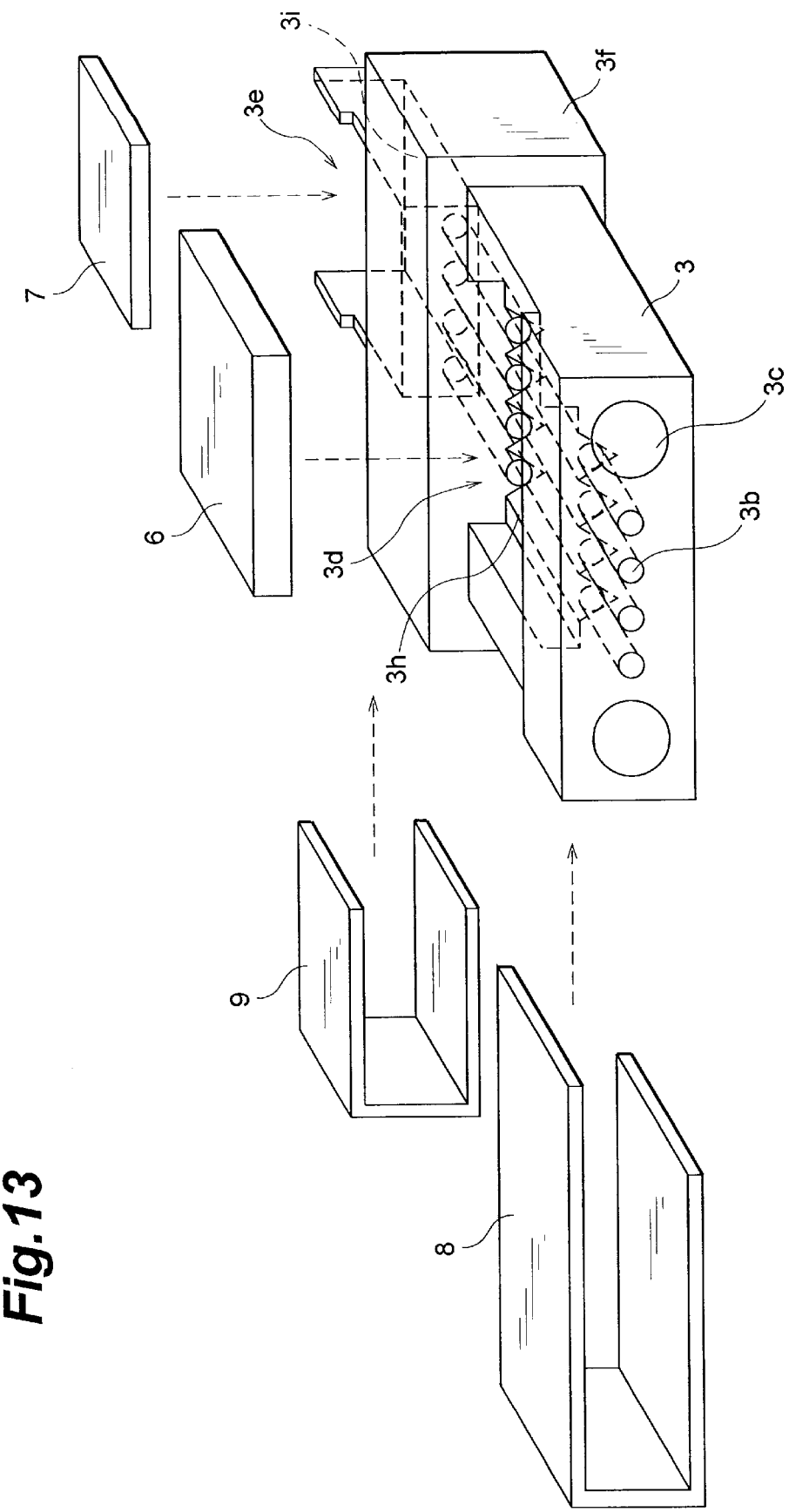
FIG. 13 is an exploded view of the optical connector shown in FIG. 11.

Disposed on the connecting end face side of the optical connector main body 3 in line with each other, as shown in FIGS. 11 to 13, are a plurality of optical fiber insertion holes 3b for inserting and securing optical fibers therein one by one, and guide pin holes 3c for inserting therein guide pins for fixing optical connectors to each other. The optical connector main body 3 is divided, successively along the hole axis from the connecting end face side, into four portions consisting of a connecting portion 3g, an optical fiber fixing portion 3d, a flange portion 3f, and a coating fixing portion 3e. Among them, the optical fiber fixing portion 3d has V-shaped grooves 3h on the respective extensions of the optical fiber insertion holes 3b. The optical fibers 1a stripped of their coating are arranged in the respective grooves 3h, whereas a pressing member 6 made of an elastic member is disposed thereon. A clip member 8 made of an elastic body such as leaf spring pinches and secures the pressing member 6 and the main body 3.

The flange portion 3f is provided with optical fiber insertion holes 3b' at the respective positions corresponding to the optical fiber insertion holes 3b of the connecting portion 3g. Of the optical connector 3, the coating fixing portion 3e has a flat ceiling face 3i, on which the coating portion 1b of the optical fiber 1 aligns therewith, and a pressing member 7 made of an elastic member is further disposed thereon. The pressing member 7 is secured to the optical connector main body 3 by a clip member 9 made of an elastic body such as leaf spring.

In the following, a method of making this multi-fiber optical connector will be explained with reference to FIGS. 11 to 13. As with the above-mentioned first embodiment, a predetermined length of coating is removed from the optical fiber ribbon 1, and thus exposed end face is subjected to discharge processing. In this state, each optical fiber 1a of the optical fiber ribbon 1 is inserted into its corresponding optical fiber insertion hole 3b in the optical connector main body 3. While the optical fiber end face 1c is projecting from the end face of the connecting portion 3g by a predetermined length d, the optical fiber 1 is pressed toward the end face 1c by a force smaller than the buckling load of the optical fiber 1.

Then, in this state, the pressing members 6 and 7 are disposed at the optical fiber fixing portion 3d and the coating fixing portion 3e and are pinched by the clip members 8 and 9, respectively, so as to be secured. As a consequence, with each optical fiber 1a being pressed by the side faces of the V-shaped groove 3h and the bottom face of the pressing member 6, and the coating portion 1b being pressed by the ceiling face 3i of the coating fixing portion 3e and the bottom face of the pressing member 7, the optical fiber 1 is secured. In this case, the coating portion 1b includes a ribbon-shaped coating which wraps the optical fibers along with their individual coatings. As compared with the case using an adhesive, this embodiment is advantageous in that the operation time can be shortened since no curing time is necessary.

Though explained here is the case where the bottom part of the optical fiber fixing portion 3d is provided with the V-shaped grooves 3h for receiving the optical fibers, these grooves are not always necessary since the optical fibers are positioned through the optical fiber insertion holes 3b and 3b'. Hence, the bottom part may be made flat such as to press the optical fibers against the bottom face of the pressing member 6. The bottom part of the coating fixing portion 3e is made flat in order to press the optical fiber ribbon in its ribbon-coated state. When an optical fiber stripped of the ribbon coating to expose the protective coating of each optical fiber or a single-line optical fiber not in a ribbon shape is to be held along with the coating, however, its corresponding U-shaped or V-shaped groove may be formed in the bottom part.

Figure 14:
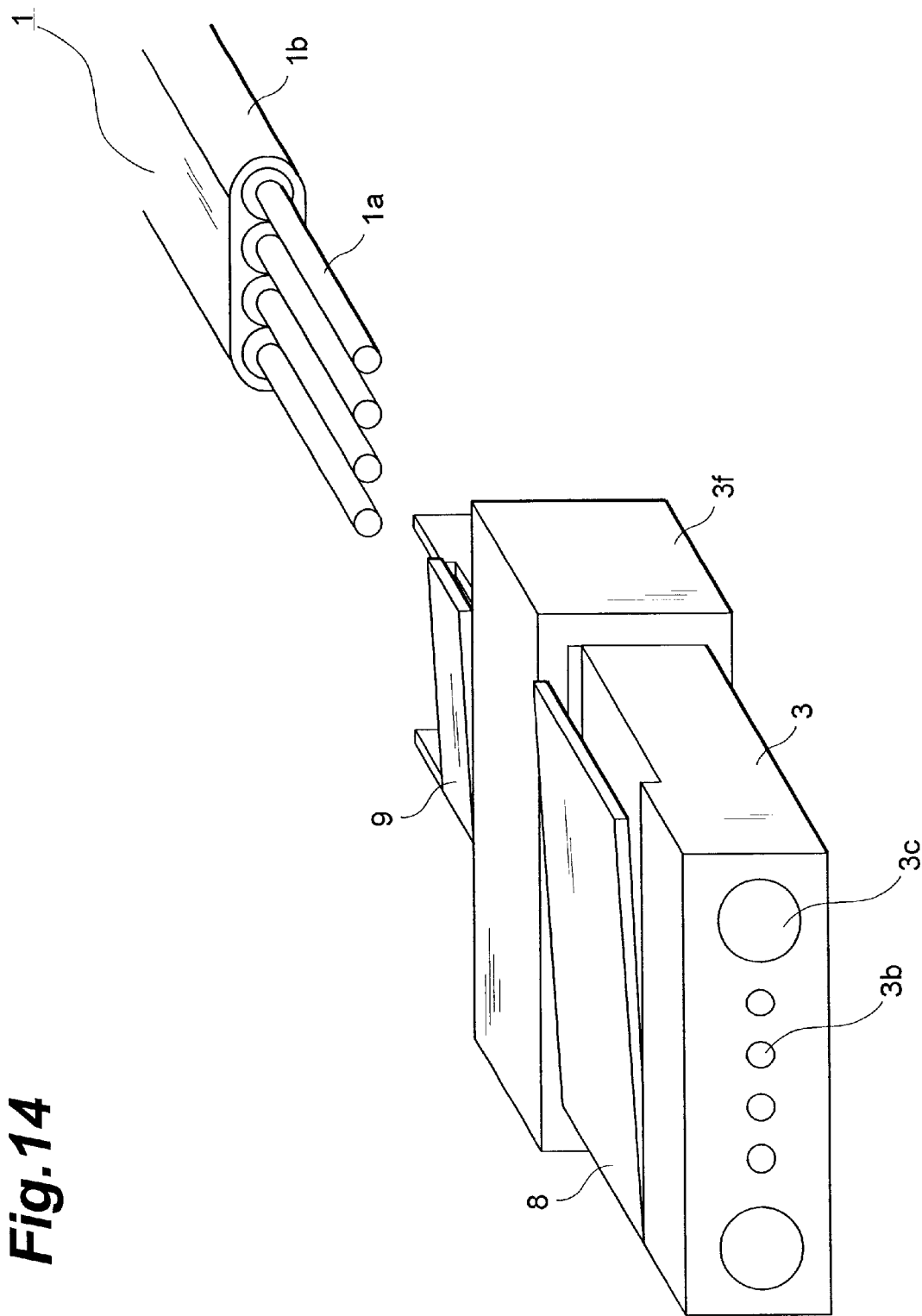
FIG. 14 is an explanatory view of a step of inserting an optical fiber into the optical connector shown in FIG. 11.

FIG. 14 is an explanatory view of another manufacturing method in this embodiment. By means of a tool or the like which is not depicted, the clip members 8 and 9 are bent slightly upward so as to release the pressure applied by the pressing members 6 and 7. In this state, an optical fiber ribbon 1 subjected to end-face processing as such as that explained in conjunction with FIG. 1 is inserted into the optical connector main body 3 from therebehind. In the state where the optical fiber 1 is pressed toward its end face with a predetermined amount of projection d, the above-mentioned tool is removed, thus allowing the optical fiber 1 to be secured. For facilitating the positioning upon inserting the optical fiber 1, the bottom part of the coating fixing portion 3e is preferably formed with a guiding groove for the optical fiber. In this case, the time required for the manufacture can further be shortened.

Figure 15A:
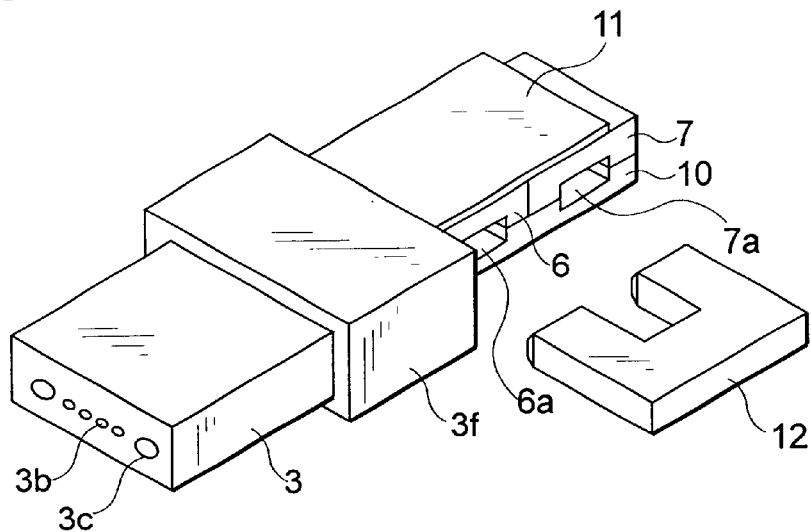
FIGS. 15A to 15E are explanatory views of another embodiment of the optical connector main body in accordance with the embodiment shown in FIG. 11 and its manufacturing steps.

FIGS. 15A to 15E show an optical connector in accordance with another embodiment of the present invention. Here, FIG. 15A shows a state before a ribbon-shaped optical fiber is fixed to an optical connector 3. Disposed behind the flange portion 3f (on the right side in the drawing) in the optical connector 3 is a fixing portion for securing the optical fiber whose front end has been processed as explained in the first embodiment and its coating portions, whereas the optical fiber is positioned by optical fiber insertion holes 3b disposed in front thereof (on the left side of the drawing). The fixing portion is constituted by a substrate 10, pressing members 6 and 7, and a clip member 11. The pressing member 6 is used for securing the optical fiber by pressing it against the substrate 10, whereas the pressing member 7 is used for securing the coating portion by pressing it against the substrate 10. Though the pressing members 6 and 7 are provided with the common clip member 11 in this embodiment, they may be provided with discrete clip members as well. Also, the pressing members 6 and 7 may form a common member. Between the substrate 10 and the pressing members 6 and 7 on the side (shown in the drawing) opposite to the side where the clip member 11 is inserted, wedge insertion holes 6a and 7a for inserting a wedge plate 12 therein are formed. The wedge insertion holes 6a and 7a do not reach the portion where the optical fiber is secured in the pressing members 6 and 7 and the substrate 10.

Figure 15B:
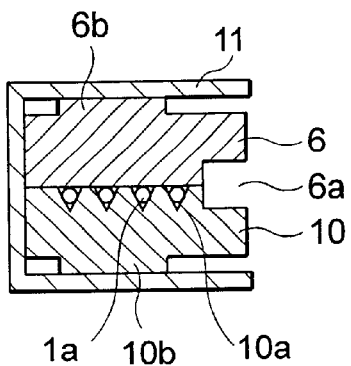

FIG. 15B is a transverse sectional view of the optical fiber fixing portion at the wedge insertion hole 6a. The upper face of the substrate 10 is formed with V-shaped grooves 10a for positioning the optical fibers 1a to be secured. When pressed by the bottom face of the pressing member 6, the optical fiber 1a disposed in each V-shaped groove 1a is secured. The clip member 11 keeps the substrate 10 and pressing member 6 in the pressed state. A similar relationship is also established between the pressing member 7 and the substrate 10 in the part of the coating fixing portion at the wedge insertion hole 7a, whereby the optical fiber coating portion 1b is secured with the substrate 10 and pressing member 7 pressed by the clip member 11. When an optical fiber ribbon is used, in particular, it is preferable for the part of the substrate 10 opposed to the bottom face of the pressing member 7 to be made flat or have a shape provided with a guide groove for facilitating insertion of the optical fiber.

Here, protrusions 6b, 7b, and 10b may be formed along the longitudinal direction, respectively, at the faces of the pressing members 6 and 8 and substrate 10 pinched by the clip member, such that the clip member 11 does not press the whole surface of each of the substrate 10 and pressing members 6 and 7 but only these protrusions 6b, 7b, and 10b. When protrusions are thus provided, the holding force of the clip member 11 can be concentrated on the protrusions, thus allowing a force to be centered on the optical fiber 1a and coating portion 1b positioned just in the middle of the protrusions. In the case of a ribbon-shaped optical fiber, fores can be applied to its individual optical fibers substantially uniformly.

A step of fixing the optical fiber to the optical connector will now be explained with reference to FIGS. 15C to 15E. While these drawings show sectional views of the wedge insertion hole 6a, the part of the wedge insertion hole 7a has substantially the same section.

Figure 15C:
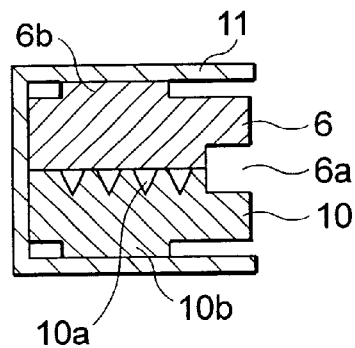
Figure 15D:
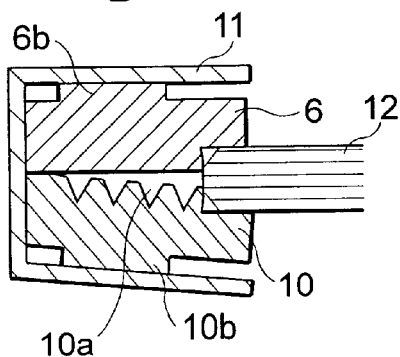

As shown in FIG. 15C, the pressing members 6 and 7 are disposed on the substrate 10, and they are pinched together by the clip member 11, so as to be pressed by a predetermined force due to the elastic force of the clip member 11. Then, as shown in FIG. 15D, each protrusion of the wedge plate 12 is inserted into the wedge insertion hole 6a or 7a formed between the substrate 10 and the pressing member 6 or 7, and is pivoted by a predetermined angle about a supporting point located on the left side of the overlapping portion between the pressing member 6 or 7 in the drawing, thus allowing the gap therebetween to broaden. Preferably, the height of the wedge insertion hole 6a and the thickness of the protrusion of the wedge plate 12 are designed such that the gaps consequently formed between the substrate 10 and the pressing member 6 and the gap formed between the part of the V-shaped groove 10a and the bottom face of the pressing member 6 have sizes smaller and greater than the outside diameter of the glass portion of the optical fiber to be inserted, respectively.

Figure 15E:
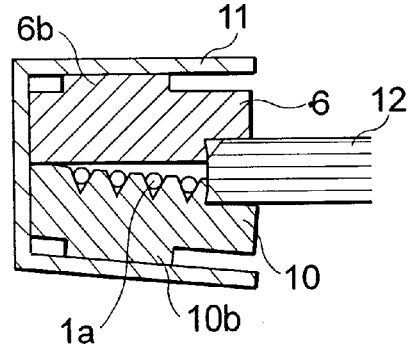

In this state, as shown in FIG. 15E, the optical fiber 1 subjected to end-face processing such as that explained in the first embodiment is inserted into the fixing portion from therebehind. When designed as mentioned above, the individual optical fibers 1a would not stick out of the grooves 10a while the optical fiber 1 is gradually being inserted therein. Also, even when the inserted optical fiber 1a is shaken, it can be prevented from coming out of the V-shaped groove 10a. As a result, each optical fiber 1a is positioned in its corresponding V-shaped groove 10a. Here, each optical fiber 1a is not completely accommodated in the V-shaped groove 10a but projects its upper portion slightly above the V-shaped groove 10a. When one or both of the substrate 10 and pressing member 6, 7 are made of a material such as aluminum or plastic which can be deformed plastically or elastically, the contact area of the fixing portion with respect to the optical fiber increases, whereby the force for securing it can be enhanced.

Thereafter, the front end of the optical fiber 1 is caused to project out of the optical fiber insertion hole 3b shown in FIG. 15A. After it is confirmed that the amount of projection has been adjusted to a predetermined value by pressing, the wedge plate 12 is pulled out, whereby, due to the restoring force of the clip member 11, the substrate 10 and the pressing member 6, 7 overlap each other again and are pressed, thus allowing the optical fibers 1a and the coating portion 1b to be held and secured (see FIG. 15B). As mentioned above, when one or both of the substrate 10 and pressing member 6, 7 are constituted by a deformable material, the V-shaped groove 10a or pressing member 6, 7 in contact with the optical fiber 1a can deform in conformity to the outer shape of the optical fiber 1a, thereby pressing the optical fiber 1a in a wider area. Depending on the material of both members and the magnitude of pressure, plastic deformation is added to elastic deformation. As a consequence, the optical fiber 1a can surely be secured. Further, a heat-shrinkable tube may surround an optical fiber ribbon beforehand and, after the optical fiber ribbon is secured, the tube may be shifted to cover the fixing portion and be heat-shrunk there to closely come into contact with the connecting portion for protecting the connecting portion. Here, the wedge insertion hole 6a, 7a may be provided in at least one of the overlapping portions between the substrate 10 and the pressing members 6 and 7. Alternatively, it may be disposed therebetween.

Figure 16:
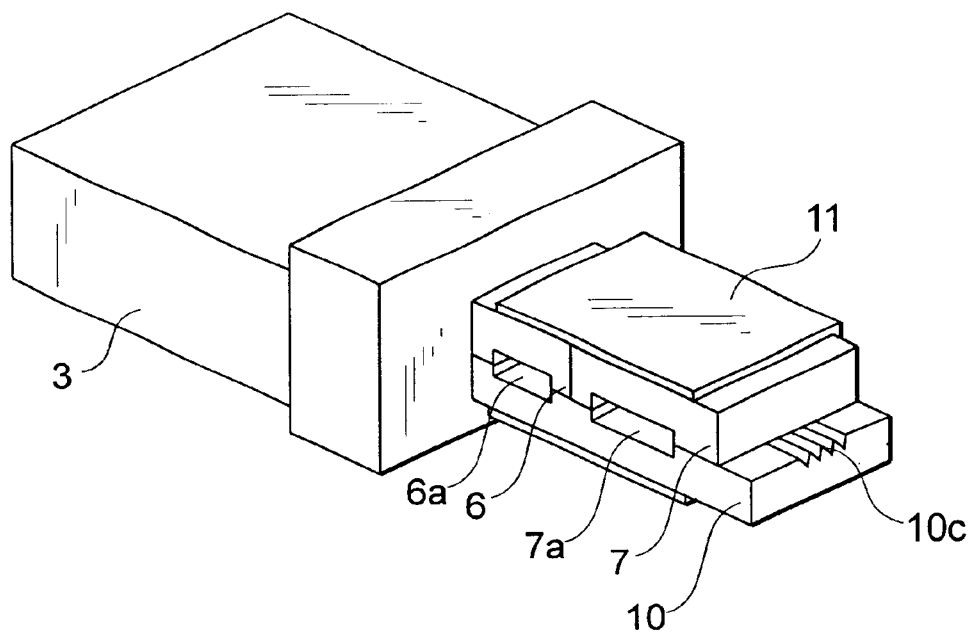
FIG. 16 is an explanatory view of still another embodiment of the optical connector main body shown in FIGS. 15A to 15E.

For facilitating insertion of an optical fiber, as shown in FIG. 16, a V-shaped groove 10c may be formed behind the substrate 10 (shown on the left side of the drawing), and the front end of the optical fiber may be guided as being slid along this V-shaped groove 10c.

Figure 17A:
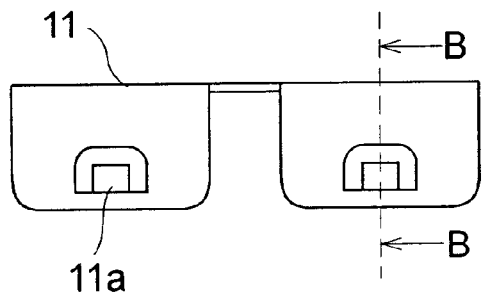
Figure 17B:
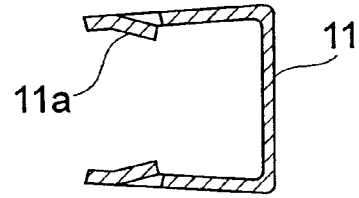

Though the clip member 11 may be formed in common for the pressing members 6 and 7 as mentioned above, its pressing portion may be divided into two as shown in FIGS. 17A and 17B, so as to separately press the two pressing members 6 and 7. Also, the pressing member may be provided with an engagement lug 11a for preventing the clip member from coming off. Though the engagement lug 11a can securely prevent the connector from accidentally breaking up upon handling, it may usually be omitted without any convenience. Also, an engagement lug may be formed on the pressing member and substrate side, while a recess engaging therewith may be formed in the clip member 11.

Thus, the optical fiber and the coating portion are fixed to the fixing portion, and the front end of the optical fiber 1b is positioned by the optical fiber insertion hole in the state where a predetermined amount projects out of the coupling face of the optical connector. Consequently, the optical fiber is less likely to be influenced by external forces, and a fixing operation can be effected in a short period of time.

FIGS. 18A to 18E are explanatory views for another embodiment of the method of making a single-fiber optical connector in accordance with the present invention.

Figure 18A:
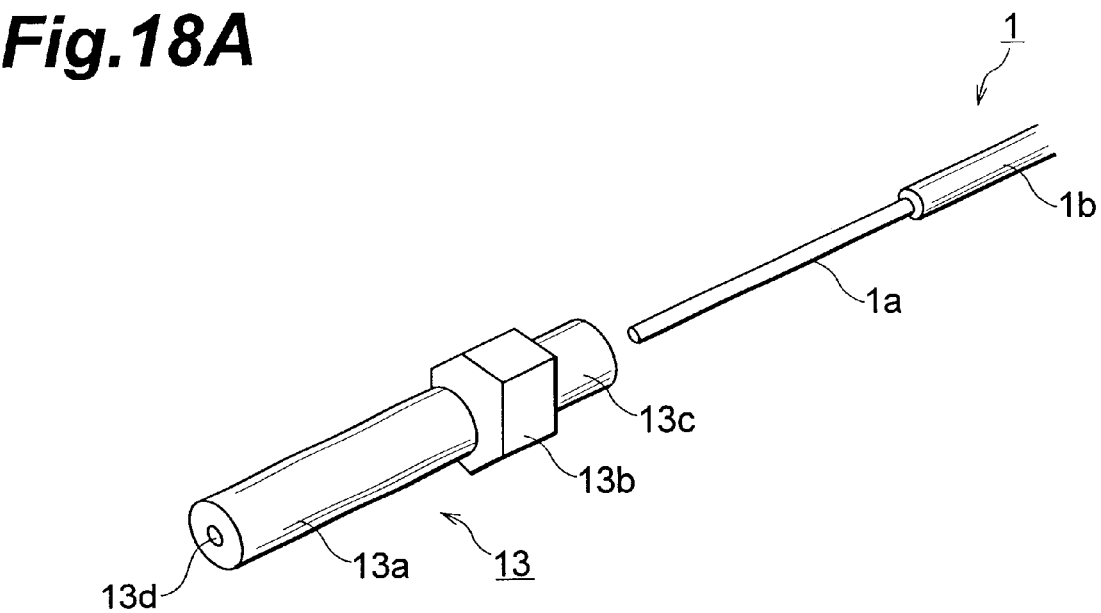
FIGS. 18A to 18E are explanatory views of a method of making an optical connector including a single optical fiber, which is a fourth embodiment of the present invention.
Figure 18B:
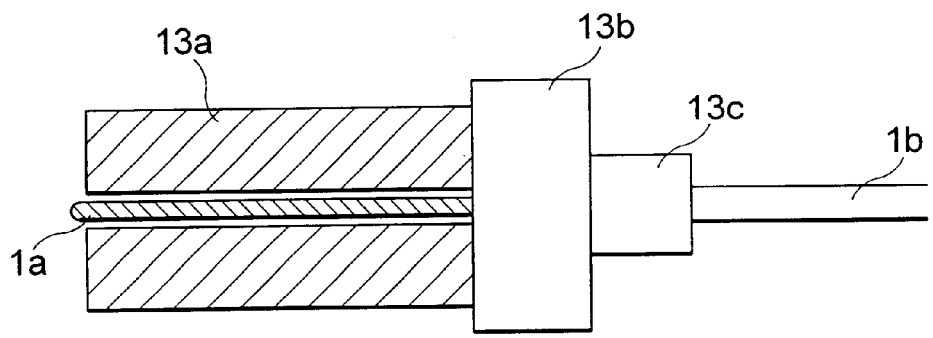
Figure 18C:
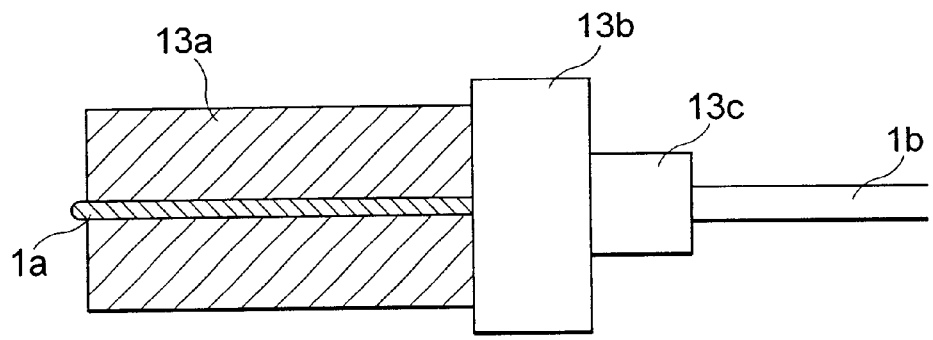

In this embodiment, glass is used for a material of the optical fiber fixing portion 13a of the optical connector 3. As shown in FIG. 18A, an optical fiber stripped of a coating is inserted into an optical connector 13 from therebehind. Then, as shown in FIG. 18B, in the state where the front end of thus exposed optical fiber 1a projects by a predetermined amount, the optical fiber fixing portion 13a is heated, so as to fix the optical fiber portion 1b to the optical fiber fixing portion 13a. In the heating operation, the optical fiber fixing portion 13a may be heated either as a whole or only partly. Upon heating, one or both of the optical fiber portion 1b and optical fiber fixing portion 13a are melted to such an extent that they can be bonded together, and are integrated together. Though the optical fiber portion 1b is depicted in FIG. 18C such as to be fixed to the whole length of the optical fiber fixing portion 13a, the optical fiber portion 1b may be fixed to the optical fiber fixing portion 13a in the vicinity of the front end portion alone. The optical fiber fixing portion 13a or the inner face thereof may be constituted by low-melting glass as well.

Figure 18D:
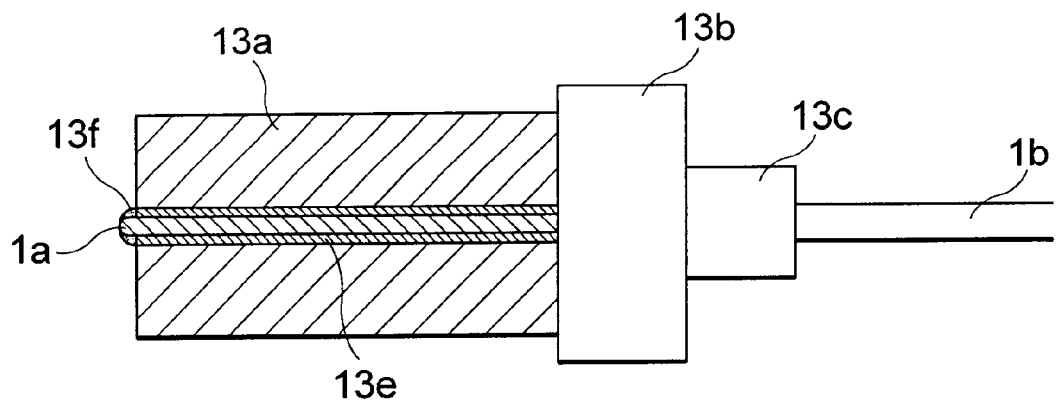
Figure 18E:
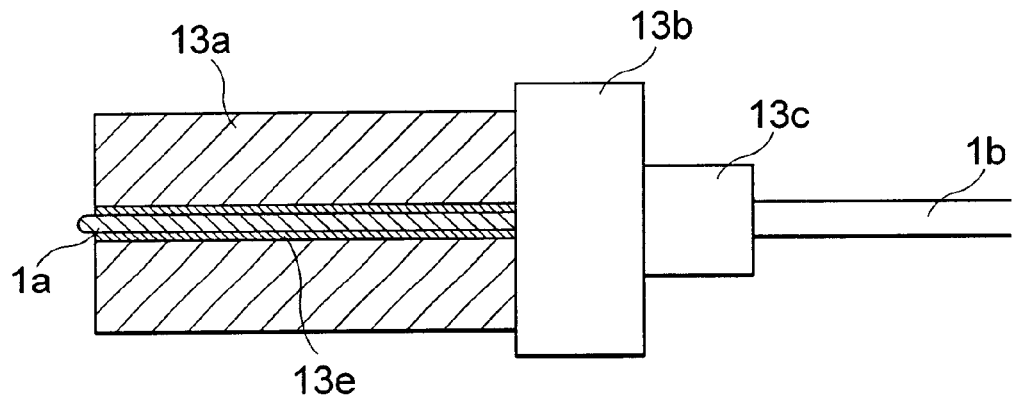

Further, as shown in FIG. 18D, an optical fiber 1a having a discharge-processed end face may be inserted into an optical connector 13 made of zirconia or the like, such that the front end thereof projects by a predetermined amount (about 1 to 10 µm). In the state where the front end face is coated with highly viscous grease 13f, an adhesive 13e is injected and cured between the optical connector 13 and the optical fiber 1a. Thereafter, the highly viscous grease 13f is eliminated, whereby the optical fiber 1a is held in the state where the front end projects out of the end face of the optical connector 13 as shown in FIG. 18E. Thus, in the step of injecting and curing the adhesive, the highly viscous grease 13f is preferably used since it can prevent the adhesive 13e for securing the optical fiber from leaking toward the connecting end face.

Figure 19A:
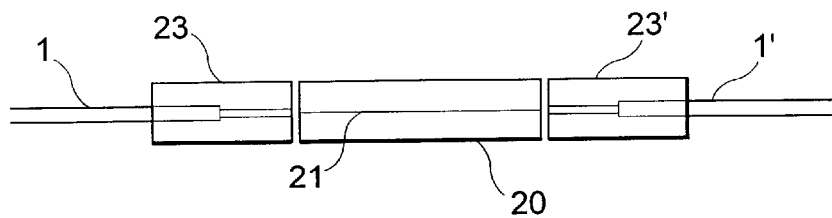
FIGS. 19A and 19B are views for explaining an optical fiber array in accordance with a fifth embodiment of the present invention which is connected to an optical waveguide.
Figure 19B:
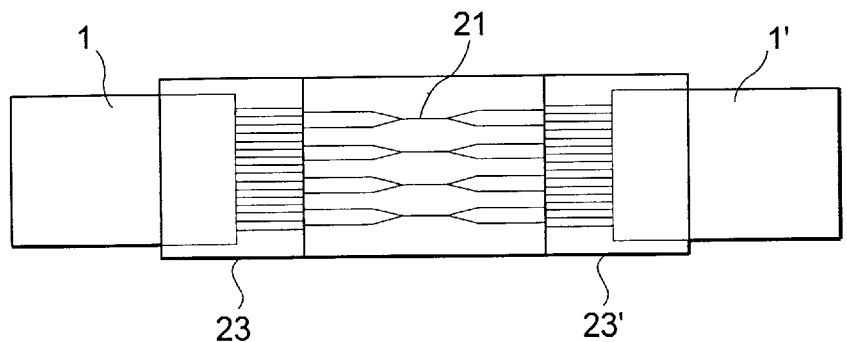

Though examples employing the present invention in the optical connector are explained in the foregoing, without being restricted to the optical connector, the present invention can be used in various kinds of optical connecting parts. FIGS. 19A and 19B show an embodiment in which the present invention is employed for connecting with an optical waveguide of an optical modulator, optical switch, or the like. The optical waveguide 21 is disposed in an optical waveguide main body 20 and is connected to optical fiber arrays 23 and 23' on both sides. The connecting end face of the optical fiber array 23, 23' is processed in a manner similar to the connecting end face of the optical connector in the first embodiment, thereby allowing each optical fiber in the optical fiber arrays 23 and 23' to be accurately butted against the optical waveguide 21 to establish optical coupling.

Figure 20:
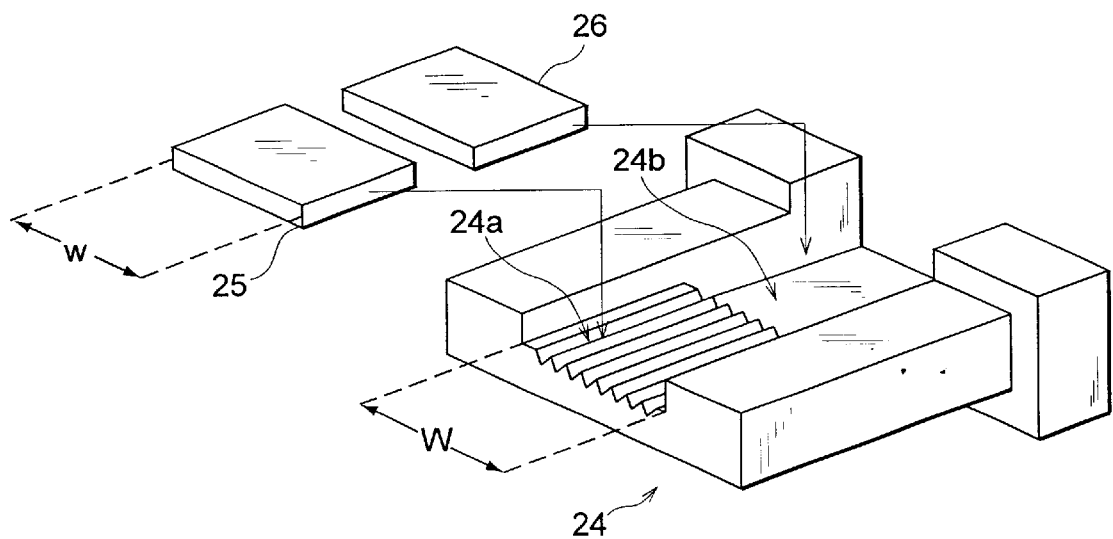
FIG. 20 is an exploded view of the main body of the optical fiber array shown in FIGS. 19A and 19B.

FIG. 20 is an exploded view of the main body portion of the optical fiber array 23. This optical fiber array 23 has a structure similar to that of the above-mentioned optical connector. Its main body 24 comprises an optical fiber fixing portion 24a provided with V-shaped grooves for aligning optical fibers on the connecting end face side, and a flat coating portion fixing portion 24b located therebehind. After optical fibers are arranged in this portion and caused to project out of the connecting face, pressing members 25 and 26 are bonded thereto while a predetermined pressure is added thereto and held as it is, whereby the optical fiber array 23 is produced.

Figure 21:
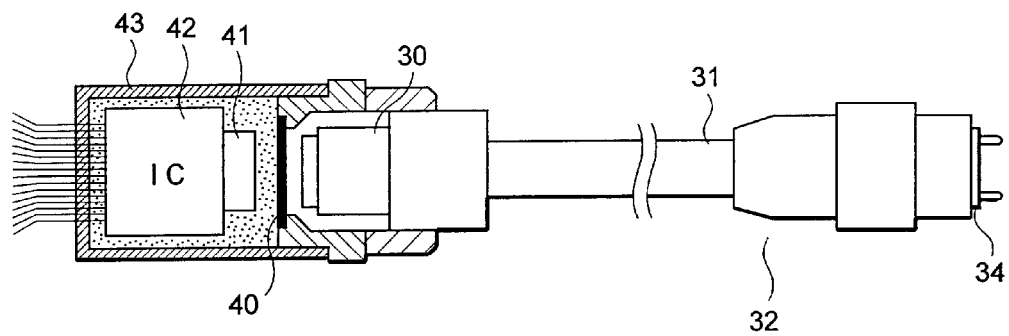
FIGS. 21 and 22 are explanatory views showing, respectively, pigtail type and receptacle type optical modules using the optical fiber array similar to that shown in FIGS. 19A and 19B.
Figure 22:
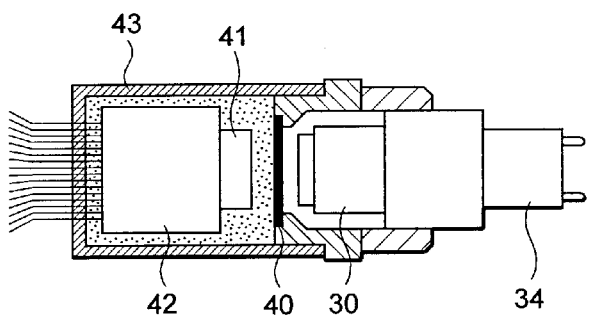

Thus produced optical fiber array is applicable not only to connections with optical waveguides but also to various kinds of optical modules. FIGS. 21 and 22 show examples in which the optical fiber array is applied to a pigtail type multi-fiber optical module and a receptacle type multi-fiber optical module, respectively. In each of these modules, an optical fiber array 30 in accordance with the present invention is fixedly disposed within a case 43 such as to face a light-emitting device or light-receiving device array 41 by away of a lens array 40. When the lens array 40 or, if it is unnecessary, the light-emitting device or light-receiving device array 41 and the optical fiber array 30 are PC-connected to each other, connection loss can be suppressed. The light-emitting device or lightreceiving device array 41 is connected to a control IC 42 contained in the case 43, thereby being electrically connected to the outside. On the other hand, the other end of each optical fiber array 30 is provided with an optical connector end 34. The optical connector end in the pigtail type shown in FIG. 21 is formed at a connector portion 32 by way of an optical fiber ribbon 31, whereas that in the case of the receptacle type shown in FIG. 22 is directly attached to the optical module main body. Thus, the present invention is applicable to various optical connecting parts between optical fibers and light-emitting or lightreceiving device arrays, and the like.

INDUSTRIAL APPLICABILITY

The optical connecting member of the present invention can be used for various kinds of optical connecting members such as optical connector, optical module, optical waveguide, and the like, thus easily enabling an optical connection with a high accuracy.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical transmission component in which one or a plurality of optical fibers are fixed to a main body of said optical transmission component with one end face of each optical fiber being exposed, and thus exposed end face is used as a connecting end face to be optically connected to another optical transmission component, the end face of each said optical fiber on the connecting end face being subjected to discharge processing, thus processed end face projecting from the connecting end face of said main body by a predetermined amount and a core portion projects from a cladding portion at said connecting end face.

2. An optical transmission component according to claim 1, wherein said optical fiber is held by a predetermined pressure added thereto along an optical axis from said end face side.

3. An optical transmission component according to claim 2, wherein said predetermined pressure is less than a buckling load of said optical fiber.

4. An optical transmission component according to claim 1, wherein said optical fiber is a graded index type optical fiber.

5. An optical transmission component according to claim 4, wherein the projecting height of the core portion with respect to the cladding portion in said optical fiber after processing is 1 to 6 μm at the center of said core portion.

6. An optical transmission component according to claim 1, wherein the amount of projection of said optical fiber is not greater than 0.2 mm.

7. An optical transmission component according to claim 1, wherein said optical fiber is fixed to said main body with an adhesive.

8. An optical transmission component according to claim 7, wherein at least a part of said main body is made of a UV-transmitting material, and wherein said adhesive is a UV-curable adhesive.

9. An optical transmission component according to claim 7, wherein said adhesive is a thermosetting adhesive.

10. An optical transmission component according to claim 1, wherein said main body has an optical fiber positioning portion and an optical fiber fixing portion which holds said optical fiber by utilizing a deformation of a member.

11. An optical transmission component according to claim 1, wherein said inbody is made of glass, and wherein said optical fiber is integrated with said main body.

12. An optical transmission component in which one or a plurality of optical fibers are fixed to a main body of said optical transmission component with one end face of each optical fiber being exposed, and thus exposed end face is used as a connecting end face to be optically connected to another optical transmission component, the end face of each said optical fiber on the connecting end face side being subjected to discharge processing, thus processed end face projecting from the connecting end face of said main body by a predetermined amount, wherein said main body has an optical fiber positioning portion and an optical fiber fixing portion which holds said optical fiber by utilizing a deformation of a member, and said optical fiber fixing portion is constituted by at least two holding members for holding said optical fiber from both directions across said optical fiber, and a pressing member.

13. An optical transmission component according to claim 12, wherein at least one of said holding members is made of aluminum.

14. An optical transmission component according to claim 12, wherein at least one of said holding members is made of a plastic.

* * * * *